United States Patent [19]

Groff et al.

[11] Patent Number: 4,969,330
[45] Date of Patent: Nov. 13, 1990

[54] TWO CYCLE ENGINE CATALYTIC EMISSION CONTROL

[75] Inventors: Edward G. Groff, Troy; Roger B. Krieger, Birmingham; Rodney B. Rask, Grosse Pointe Woods; Robert A. Bolton; Paul E. Reinke, both of Rochester, all of Mich.

[73] Assignee: General Motors Corporation, Detroit, Mich.

[21] Appl. No.: 369,240

[22] Filed: Jun. 21, 1989

[51] Int. Cl.⁵ .................. F01N 3/28; F02B 75/02; F02B 27/02
[52] U.S. Cl. ............................ 60/288; 60/284; 60/314; 123/65 PE
[58] Field of Search .............. 60/274, 288, 324, 301, 60/292, 284, 279, 314; 123/65 PE

[56] References Cited

U.S. PATENT DOCUMENTS

| | | | |
|---|---|---|---|
| 1,477,994 | 12/1923 | Buchi | 60/314 |
| 2,393,341 | 1/1946 | Schneider | 123/65 PE |
| 3,670,502 | 6/1972 | Firey | 60/324 |
| 4,304,207 | 12/1981 | Aihara | 60/279 |
| 4,862,689 | 9/1989 | Duret | 60/284 |

FOREIGN PATENT DOCUMENTS 253114 10/1988 Japan ................. 123/65 PE
WO8903929 5/1989 PCT Int'l Appl. .

Primary Examiner—Douglas Hart
Attorney, Agent, or Firm—Robert J. Outland

[57] ABSTRACT

Combinations of split and valved exhaust ports are provided in a ported two cycle engine with divided emission control system to provide better control of the division of exhaust gas flow to the two converters.

2 Claims, 3 Drawing Sheets

TWO CYCLE ENGINE CATALYTIC EMISSION CONTROL

TECHNICAL FIELD

This invention relates to two-stroke-cycle internal combustion engines, commonly and hereafter called two cycle engines. The invention also relates to emission control systems for such engines. In particular embodiments, the invention relates to divided exhaust flow emission control systems and to means for controlling the separation of blowdown and scavenging portions of the exhaust gases for enhancing exhaust treatment and protecting the associated catalytic devices.

BACKGROUND

It is known from U.S. Pat. application No. 347,634 filed May 5, 1989 and assigned to the assignee of the present invention to provided a two cycle engine with a divided exhaust flow emission control system and to provide splitter means for separating the engine exhaust gases into blowdown and scavenging portions for separate treatment in the divided emission control system. The disclosure of said prior application is incorporated herein by reference for background information.

While the arrangements disclosed in the noted prior application provide a considerable degree of freedom in controlling the division of exhaust flow to the emission control, more flexible flow divider systems could provide more complete control of the emission system operation.

SUMMARY OF THE INVENTION

The present invention involves modification of the arrangements of prior U.S. Pat. application No. 347,634 to include multiple exhaust ports having separate flow timing and dividing control means that provide a greater variety of gas flow control options. Through suitable operation of the flow control means, greater exhaust gas emission control effectiveness may be realized and protection of the associated catalytic converter devices may be improved.

These and other features and advantages of the invention will be more fully understood from the following description of certain specific embodiments of the invention taken together with the accompanying drawings.

BRIEF DRAWING DESCRIPTION

DETAILED DESCRIPTION - PRIOR ARRANGEMENT

Figure 1:
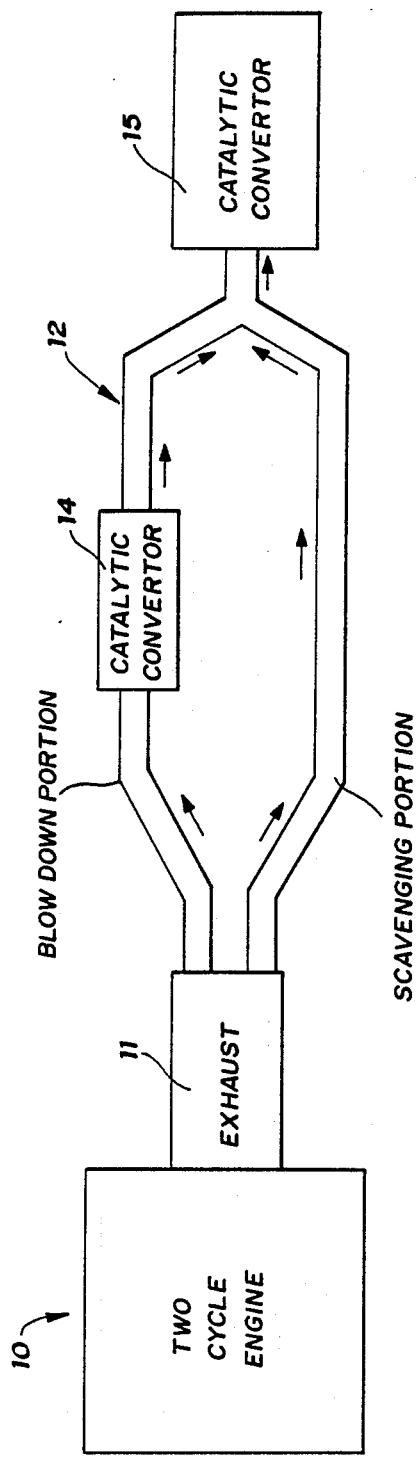
FIGS. 1 and 2 illustrate the prior emission control system and two cycle engine arrangements disclosed in FIGS. 1 and 2 of the noted prior patent application.

Referring now to the drawings in detail, numeral 10 generally indicates a two cycle engine as disclosed in the noted prior U.S. Pat. application No. 347,634. Engine 10 is of the crankcase scavenged, spark ignited, cylinder fuel injection type and includes at least one cylinder exhaust port 11 for each cylinder having means for separating the exhaust gas flow into blowdown and scavenging portions.

The blowdown portion comprises that part of the exhaust gas from each exhaust event which is discharged first during the opening of the exhaust port. It consists largely of burned charge, usually with some products of incomplete combustion and excess air, and is at a relatively high temperature dependent upon the rate of combustion and the engine operating conditions. The scavenging portion comprises the remaining part of the gas from each exhaust event. It is at a substantially lower temperature as it includes a substantial amount of bypassed scavenging air that has mixed with the exhaust gas and is forced from the cylinder during the scavenging process.

Emission System

Figure 2:
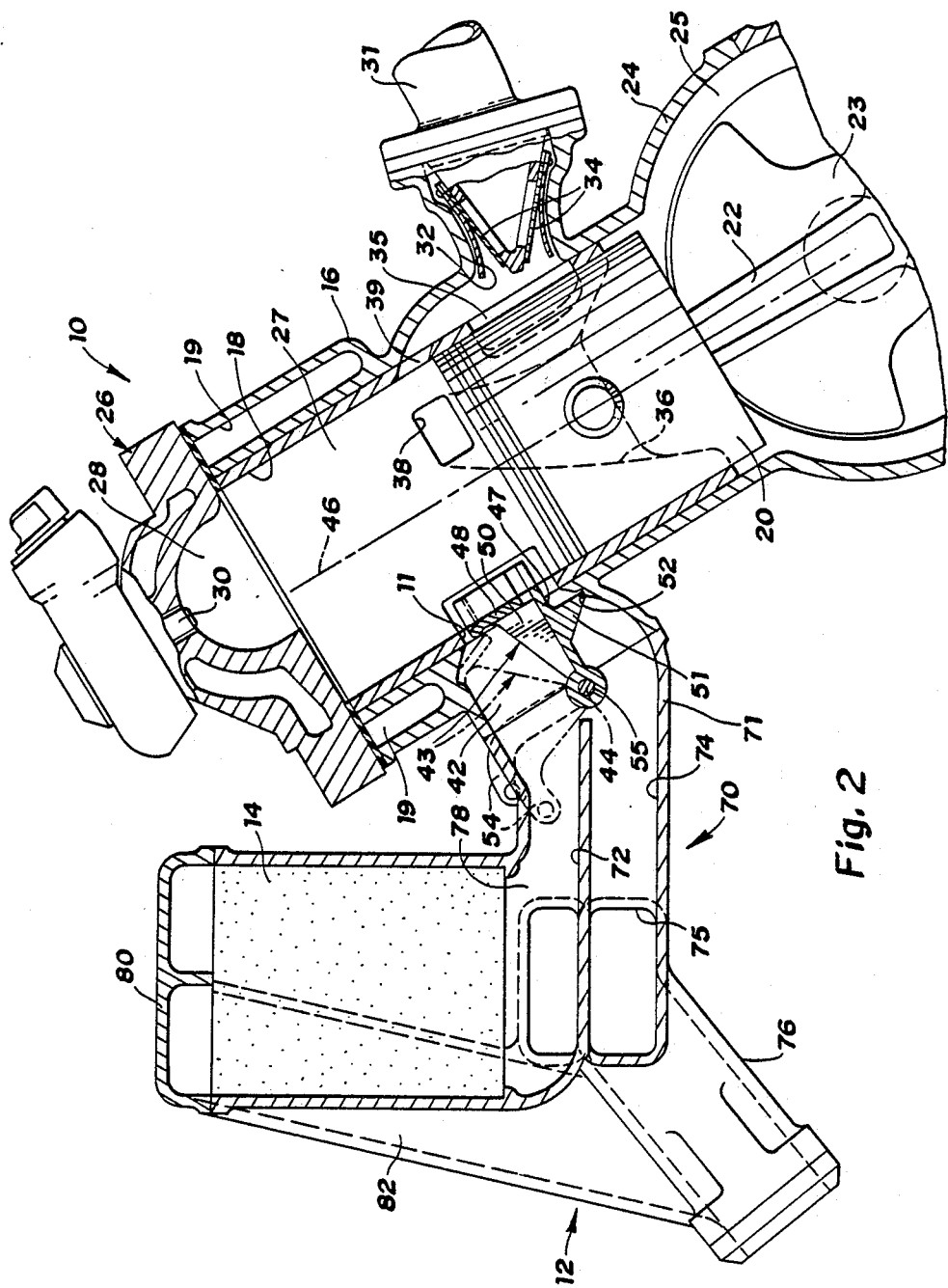

As shown in FIGS. 1 and 2, the engine 10 is connected with an emission control system 12, a prime element of which is a first catalytic converter 14 that is connected, preferably in close-coupled fashion, to receive and treat the blowdown exhaust gas. In the preferred form shown in FIG. 1, the treated exhaust gas discharged from the first converter 14 is mixed with the exhaust gas scavenging portion discharged from the engine and the mixture is passed through a second catalytic converter 15 for the purpose of treating the remaining emission products.

In operation, when a cold engine is started, the separate catalytic treatment of the hotter blowdown gases allows the first converter 14 to reach its operating temperature faster than would be possible if all the exhaust gases were mixed together. The exothermic operation of the first converter further heats the treated blowdown gases so that when they are mixed with the cooler scavenge gases, the mixture is warmed further by the added heat of the first converter. The second converter 15 is thereby aided in reaching its operating temperature earlier. Thus the exhaust emissions from the engine reach the operating control condition sooner than would be the case if a single converter were connected to treat all the exhaust gas together without providing additional heating means. The exhaust gas separation also results during extended idle and light load operation in maintaining the first converter 14 hot enough to provide continued effective emission control.

Engine Arrangement

FIG. 2 shows the arrangement of the prior engine and emission control system. The engine 10 includes a cylinder block 16 having a plurality of cylinders 18, only one of which is shown. The cylinders 18 may comprise cast iron or alloy liners inserted or cast into an aluminum or other material block 16 which includes coolant passages 19 adjacent to the upper portions of the cylinder bore.

Pistons 20 are supported for reciprocation within the cylinders 18 and are connected by connecting rods 22 to a crankshaft 23. The crankshaft is rotatably journaled within a crankcase 24 defined, at least in part, by the lower portion of the cylinder block 16 and separated longitudinally into individual crankcase chambers 25 located beneath each of the cylinders 18.

The upper ends of the cylinders 18 are closed by a cylinder head 26 mounted on the cylinder block. The head 26 cooperates with the cylinders 18 and the heads of the pistons 20 to form working chambers 27 that include at their upper ends, combustion chambers 28 primarily defined by recesses in the cylinder head 26. A fuel injection nozzle 30 is fixed to the cylinder head near the top of each combustion chamber to deliver atomized fuel thereto, preferably with a pressurized air charge in known manner. A spark plug, not shown, is also provided to ignite air-fuel mixtures formed in the combustion chamber.

Fresh air charges are delivered to each crankcase chamber 25 during upward movement of its respective piston 20 from an air inlet manifold 31 through an associated intake port 32 formed in the cylinder block. A reed-type valve 34 in the intake port 32 prevents reverse flow. The downstream end of each intake port 32 communicates through a piston controlled opening 35 with its respective crankcase chamber 25 as the piston approaches its top dead center position.

A plurality of main scavenge passages 36 extend from each of the crankcase chambers 25 through the cylinder block 16 and scavenge ports 38 in the respective cylinder to discharge into its working chamber 27 when the piston approaches its bottom dead center position. The scavenge ports 38 are configured to direct the scavenge and intake charges toward one side of the cylinder from which they are deflected in an upward direction toward the combustion chamber 28.

An auxiliary intake or boost port 39 extends directly from the intake port 32 into the working chamber when the piston is near bottom dead center. The boost port is also configured to assist the direction of the intake charge toward the combustion chamber as previously described.

An exhaust port 11 opens through the side of each cylinder opposite to the area where the scavenge charge impinges and the boost port 39 is located. The exhaust port 11 extends in the cylinder somewhat above the scavenging and boost ports 38, 39 in the direction of the combustion chamber so that the exhaust port is opened first as the piston moves downward on its expansion stroke. The port 11 communicates through a valve chamber 42 with an exhaust manifold and emission control system.

In operation of the engine portions so far described, air is drawn into each crankcase chamber 25 on the upstroke of its respective piston 20 while a previous air charge is being compressed and mixed with atomized fuel injected after the closing of the cylinder ports. Near top dead center, the air-fuel mixture is ignited by the spark plug and burns as the piston begins its downstroke.

As the burned gas expands, the piston uncovers first the top of the exhaust port 11, causing the cylinder pressure to drop as a hot blowdown pulse of burned gas is forced out of the cylinder. Shortly thereafter, the scavenging and boost ports 38, 39 are opened and the slightly pressurized air charge in the associated crankcase chamber is forced into the cylinder. This forces the remaining burned gas and some of the scavenging air out of the cylinder through the exhaust port 11 while a fresh charge of air is left in the cylinder, ready for the next compression stroke.

Exhaust Valve

A separating and timing device or exhaust valve 43 is located in the valve chamber 42 and is pivotable on an axis 44 spaced outward of the cylinder 18 and transverse to the cylinder axis 46. The valve 43 includes a separating wall or splitter 47 that, in a lower position, extends from the axis 44 into and laterally across the exhaust port 11, separating it into upper and lower sections. Spaced above the splitter 47 within the port is a timing shroud 48 that, along with the splitter 47, has an inner surface nearly coplanar with the interior surface of the associated cylinder when the valve is in its lower position.

The valve 43 is provided with upstanding side walls 50 that extend from the pivot axis 44 to the port 11 and support the shroud 48 at a fixed distance above the inner edge of the splitter 47. A stop 51 may be provided extending downward from one of the side walls 50 to engage an abutment 52 of the block and thereby limit the downward motion of the valve 43. An actuating lever 54 connects with a shaft 55 that lies along the valve axis 44 and preferably engages the valves 43 for each of the engine cylinders. In the drawings, the lever 54 extends upwardly so that outward movement thereof pivots the valve upwardly from its lower position toward an upper position (shown in dashed lines in FIG. 2) where the splitter 47 is near the upper edge of the exhaust port 11.

In operation, the movement of the valve is effective to vary the timing of the blowdown pulse through raising and lowering of the shroud 48. The splitter 47 acts to separate the blowdown portion of the exhaust gas from the scavenging portion, the two portions being primarily directed into separate parts of the valve chamber 42 which are respectively above and below the splitter. This function is most effective when the valve 43 is in its lowest position as would be the case for lower speeds and bonds where highest efficiency is desired.

As the valve 43 is tilted upward, the exhaust blowdown timing is advanced as desired for higher speed and heavier load operation. The shroud 48 and splitter 47 also move farther away from the piston side, allowing more leakage between the sections. When the valve is fully raised, as shown in the dashed lines, the splitter 47 approaches the top of the cylinder exhaust port 11 so that nearly all of the exhaust flow is through the lower portion of the exhaust valve chamber 42.

If necessary or desired, the splitter can be made to overtravel upward to block the flow through the upper portion and block all flow to the close coupled converter. This feature can be used to protect the close coupled converter against operation at excessive temperatures if that should be a problem.

Exhaust Manifold

Connected to the valve chambers 42 is an exhaust manifold 70 which incorporates specific features forming part of the previously described emission control system 12. Manifold 70 includes a plurality of dual legs 71 having upper and lower passages 72, 74 respectively. The legs 71 attach directly to the housings of the valve chambers 42 of the various engine cylinders, the upper passages 72 and lower passages 74 connecting respectively with the upper and lower sections of their connected valve chambers.

The lower passages 74 also connect with a lower log or plenum 75 that directly feeds an outlet duct 76. The upper passages 72 connect with an upper plenum 78 above which is mounted a catalytic converter element which comprises the first catalytic converter 14 of the system 12 previously described. A cover 80 on the manifold portion housing the element 14 connects the outlet thereof through a transfer duct 82 to the outlet duct 76. The duct 76 is adapted for connection with an exhaust conduit, not shown, which will preferably include a second catalytic converter 15 as previously described.

In operation, the upper passages 72 receive the blowdown portion of the exhaust gas from the upper sections of the valve chambers 42 and direct them through the close coupled catalytic element 14. The reacted products are then mixed in the outlet duct 76 with the scavenging portion of the exhaust carried through the lower passages 74 and delivered to the second converter 15 in the exhaust conduit.

Modifications of Present Invention

For purposes of the disclosure, an engine and emission system according to the present invention should be considered essentially similar in construction and operation to the embodiments heretofore shown and described except for certain modifications discussed hereafter.

Figure 3:
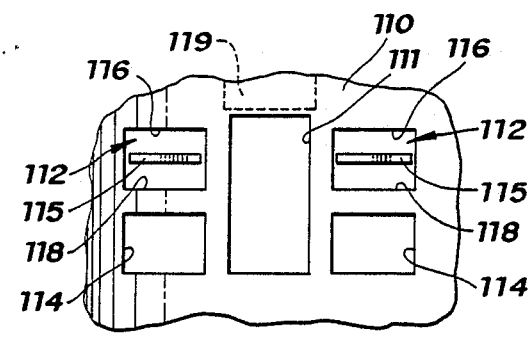
FIG. 3 is a schematic face view from within the cylinder of modified intake and exhaust port means according to the invention applied to an engine similar to that of FIG. 2.
Figure 4:
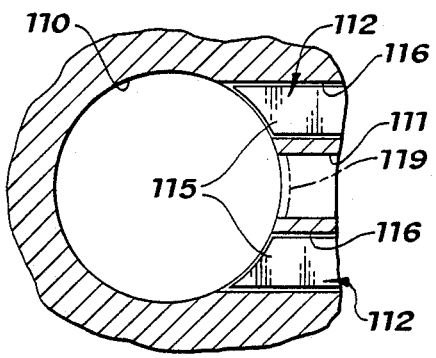
FIG. 4 is a schematic top view of the cylinder and port means of FIG. 3.

FIGS. 3 and 4 show one embodiment which incorporates loop scavenging (with the inlet ports on the same side as the exhaust ports) rather than the previously described arrangement using cross scavenging (with the inlet ports opposite the exhaust port in the cylinder). The cylinder 110 has on one side a central exhaust port 111, a pair of side exhaust ports 112 located on either side of the central port and slightly below its upper edge, and a pair of inlet ports 114 below the side exhaust ports and aligned with the bottom of the central port 111.

The side ports 112 each have associated therewith a splitter 115 similar in function to the splitter 47 of the prior system but absent an attached timing shroud 48. The splitter 115 may be fixed or adjustable as desired and each divides its respective side port into an upper portion 116 and a lower portion 118.

The central port 111 is provided with some form of control valve to restrict or time, or both, the flow of exhaust flow therethrough. For illustration purposes a guillotine valve 119 is shown but flapper, rotary, butterfly or other valve types may be equally suitable. The valve 119 is preferably mounted as close to the cylinder wall as possible to maximize the control of gas flow.

Figure 5:
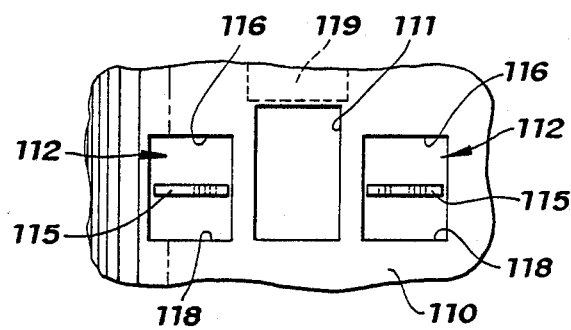
FIG. 5 is a schematic face view of another embodiment of exhaust port means according to the invention.

FIG. 5 shows a similar embodiment arranged for cross scavenging so that the inlet ports (not shown) are across the cylinder and only central exhaust port 111 and two side exhaust ports 112 are shown. The side ports are aligned with the lower portion of the central port and somewhat below its top as before. Splitters 115 in the side ports and a valve 119 in the central port are provided as before.

In both embodiments, the central ports 111 as well as the lower portions 118 of the side ports are connected to the lower passages 74 of the exhaust manifold or its equivalent which feed exhaust gas to the second (distant) catalytic converter 15. The upper portions 116 of the side ports are connected to the upper passages 72 of the exhaust manifold to feed exhaust gas directly to the close coupled first catalytic converter 14.

In operation, control of the guillotine valve 119 or other valve in the central port 111 is effective to control the direction of flow of the exhaust blowdown to the first or second converter. At high loads and speeds, the valve 119 is opened to the blowdown and scavenging flow to primarily pass directly to the second distant converter 15 so as to avoid overheating of the close coupled unit 14. At low loads and speeds or during warm-up, the central port 111 may be closed so that the exhaust flow all passes out the side ports 112. In this case, most of the blowdown flow is directed to the first converter 14 to keep it warm or to quickly reach effective operating temperature while the lower temperature scavenging gas is directed to the second converter as in the prior arrangement. Partial opening of the valve 119 at other operating conditions can be used to control the division of gas flow between the two converters as desired.

Careful matching of the exhaust gas flow separation with the scavenging and fuel delivery processes provides the potential for achieving stoichiometric or richer combustion in some or all of the cylinder charge. Thus, the possibility is raised of obtaining some $NO_x$ reduction in the close mounted catalyst. Additionally, the arrangements can provide variable exhaust port timing as desired to enhance engine thermal and charge trapping efficiencies.

Figure 6:
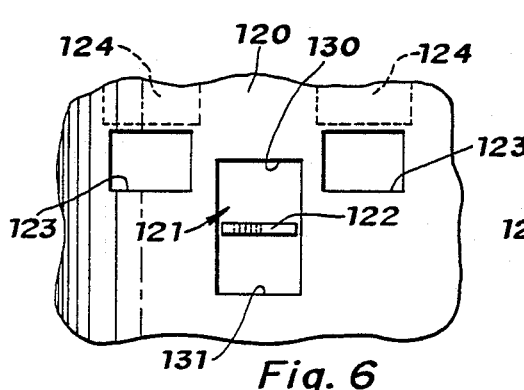
FIG. 6 is a schematic face view of still another embodiment of exhaust port means according to the invention.
Figure 7:
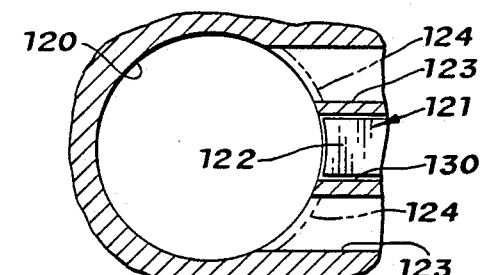
FIG. 7 is a schematic top view of the cylinder and port means of FIG. 6.

FIGS. 6 and 7 show a different port arrangement for cross scavenging operation wherein the cylinder 120 is provided with a central exhaust port 121 having a splitter 122 and there are two higher located side exhaust ports 123. The side ports 123 are provided with suitable control valves such as guillotine valves 124.

Figure 8:
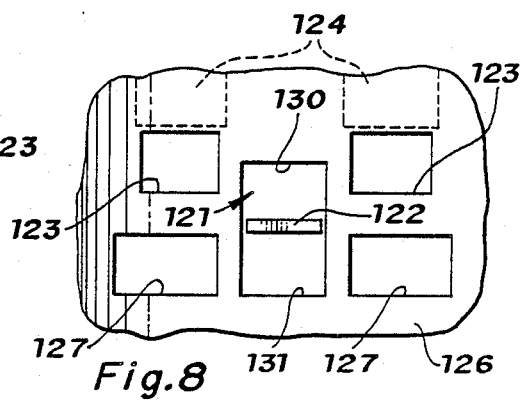
FIG. 8 is a schematic face view of still another embodiment of intake and exhaust port means according to the invention.
Figure 9:
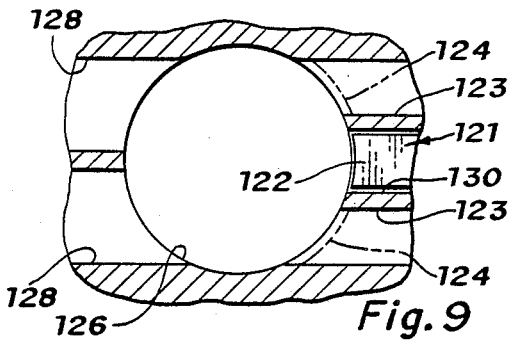
FIG. 9 is a schematic top view of the cylinder and port means of FIG. 8.

FIGS. 8 and 9 show a similar embodiment arranged for combined cross-loop scavenging. The cylinder 126 has the exhaust ports 121, 123, splitter 122 and valves 124 arranged as in FIGS. 6 and 7. However there are added inlet transfer ports 127 on either side of the lower portion of the central port 121 in addition to boost ports 128 located across the cylinder 126.

In both of the latter embodiments, the splitter 122 divides the central port into an upper portion 130 and a lower portion 131 which are respectively connected to the upper 72 and lower 74 manifold passages. The side ports 123 are both connected to the lower passages 74.

In operation, positioning of the guillotine valves 124 is effective to determine how much of the blowdown and scavenging flow is directed through the first opening side ports 123 via the lower manifold passages 74 to the distant converter 15 and how much flow remains for transfer through the split central port 121 via the upper passages 72 to the close coupled converter 14. In other ways, control of the arrangements of FIGS. 6–9 is similar to that of the embodiments of FIGS. 3–5.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. An emission control system in combination with a two-stroke cycle engine of the type having a cylinder with a piston controlling exhaust means, means for admitting scavenging air during an open period of the exhaust means and means for supplying fuel to the cylinder for mixing with a fresh air charge after closing of the exhaust means, said emission control system having fir-st and second exhaust passages connected with the exhaust means, separating means for delivering into said first passage a first portion of the gas exhausted through the exhaust means and for delivering into said second passage a second portion of the gas exhausted through the exhaust means, first exhaust treatment means connected with said first passage for treating exhaust gases delivered to said first passage, and second exhaust treatment means connected with said second passage and with an outlet of said first exhaust treatment means for treating a mixture of gases from said second passage and from said first treatment means, and the improvement wherein said exhaust means includes at least first and second exhaust ports, said first exhaust port being connected with both said passages and including one of said separating means for segregating the exhaust flow through said first port into said passages, said second exhaust port being connected only with said second exhaust passage and controlled by the piston to open prior to said first exhaust port, and control means coacting with said second port to selectively control flow therethrough to vary as desired the timing and volume of flow to the first and second passages under various engine operating conditions.

2. A combination as in claim 1 wherein said separating means divides said first port into upper and lower portions that are respectively opened in sequence upon downward motion of the piston, said upper portion being connected with said first passage for directing exhaust gases to said first- treatment means and said second portion being connected with said second passage for directing exhaust gases to said second treatment means.

* * * * *